US007305113B2

(12) United States Patent
Yoshida et al.

(10) Patent No.: US 7,305,113 B2
(45) Date of Patent: Dec. 4, 2007

(54) PAPER-LIKE SHEET DISCRIMINATOR

(75) Inventors: Takashi Yoshida, Minori (JP); Kenji Okuna, Seto (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 699 days.

(21) Appl. No.: 10/772,377

(22) Filed: Feb. 6, 2004

(65) Prior Publication Data

US 2004/0208351 A1 Oct. 21, 2004

(30) Foreign Application Priority Data

Apr. 17, 2003 (JP) ............................ 2003-112301

(51) Int. Cl.
*G06K 9/00* (2006.01)
*G06K 9/74* (2006.01)
*G06K 5/00* (2006.01)
*G07D 7/00* (2006.01)
*B07C 5/00* (2006.01)

(52) U.S. Cl. ....................... 382/135; 356/71; 340/5.86; 194/302; 209/534; 235/379

(58) Field of Classification Search ........ 382/135-140; 356/71; 340/5.86; 271/107; 194/302, 334-335; 209/379; 235/379
See application file for complete search history.

(56) References Cited

U.S. PATENT DOCUMENTS 3,679,314 A * 7/1972 Mustert ....................... 356/71
3,922,090 A * 11/1975 Fain ............................ 356/71
4,462,587 A 7/1984 Graef et al.
4,618,257 A * 10/1986 Bayne et al. ................. 356/71
4,710,627 A 12/1987 Baltes et al.
4,750,140 A * 6/1988 Asano et al. ............... 382/108
4,820,912 A * 4/1989 Samyn ...................... 340/5.86
4,823,393 A * 4/1989 Kawakami .................. 382/135
4,881,268 A * 11/1989 Uchida et al. .............. 382/135
5,122,754 A * 6/1992 Gotaas ....................... 194/213
5,367,577 A * 11/1994 Gotaas ....................... 382/135
5,465,821 A * 11/1995 Akioka ....................... 382/135
5,607,040 A * 3/1997 Mathurin, Sr. ............... 356/71
5,909,503 A * 6/1999 Graves et al. .............. 382/135

(Continued)

FOREIGN PATENT DOCUMENTS

EP 0 329 081 8/1989

(Continued)

*Primary Examiner*—Ishrat Sherali
*Assistant Examiner*—Manav Seth
(74) *Attorney, Agent, or Firm*—Antonelli, Terry, Stout, & Kraus, LLP.

(57) ABSTRACT

A paper-like sheet discriminator has reference rollers for detection of a thickness of a paper-like sheet and a detection roller opposing the reference rollers. The paper-like sheet is passed between the reference rollers and the detection rollers and its thickness is detected from a displacement of the lever. Wavelength components less than a specified wavelength are extracted from a signal indicative of a thickness of the paper-like sheet passing through the respective thickness detection sensors and appearance positions on the paper-like sheet are determined at which the extracted wavelength components being less than the specified wavelength and having amplitude either not less than or less than a constant value appear. The thus determined appearance positions are collated with precedently stored appearance positions so as to discriminate genuineness/spuriousness of the paper-like sheet.

18 Claims, 7 Drawing Sheets

U.S. PATENT DOCUMENTS

| | | | | |
|---|---|---|---|---|
| 6,438,262 | B1 * | 8/2002 | Bernardini et al. | 382/135 |
| 6,748,101 | B1 * | 6/2004 | Jones et al. | 382/135 |
| 6,771,357 | B1 * | 8/2004 | Inukai | 356/71 |
| 6,994,203 | B2 * | 2/2006 | Zoladz et al. | 194/302 |
| 7,167,247 | B2 * | 1/2007 | Uemura et al. | 356/432 |
| 2002/0110396 | A1 | 8/2002 | Ueoka | |

FOREIGN PATENT DOCUMENTS

| | | |
|---|---|---|
| EP | 0 817 135 | 7/1998 |
| EP | 1 357 522 | 10/2003 |
| GB | 2 299 665 | 10/1996 |
| JP | 63-247895 | 10/1988 |

* cited by examiner

PAPER-LIKE SHEET DISCRIMINATOR

BACKGROUND OF THE INVENTION

The present invention relates to paper-like sheet discriminators.

In an apparatus for handling paper money such as, for example, automatic teller machine (ATM) or vending machine, discrimination of genuineness/spuriousness of paper money is important and therefore, the apparatus incorporates a paper-like sheet discriminator in the form of a paper money discriminator.

As a conventional paper money discriminator for discriminating the genuineness/spuriousness of paper money, an apparatus described in, for example, JP-A-63-247895 has been known.

In the paper money discriminator described in the gazette, paper money is inserted between a reference roller and one end of a detection lever, a displacement of the lever is detected with a displacement detection means provided at the other end of the detection lever and the genuineness/spuriousness is discriminated in accordance with the number of depressions and raised portions in the detected displacement signal to exclude spurious paper money prepared with color printer, color copier or the like.

In the apparatus described in the aforementioned JP-A-63-247895, a thickness of paper money is detected to deliver a detection signal and the number of depressions and raised portions is detected from the detection signal to discriminate the genuineness/spuriousness.

Some spurious paper money is, however, skillfully spurious paper money having unevenness intentionally formed on a printing surface or paper sheet and such a spurious paper money sheet is difficult to discriminate from genuine paper and is therefore possibly overlooked with the conventional paper money discriminator.

In addition, there is also a possibility that erroneous detection happens in which delicate crumples formed in paper money are recognized as depressions/raised portions and even genuine paper is determined to be spurious paper.

BRIEF SUMMARY OF THE INVENTION

An object of the present invention is to provide a paper money handling unit capable of performing highly accurate genuineness/spuriousness discrimination.

To accomplish the above object, in a paper-like sheet discriminator having a paper-like sheet thickness detection device for detecting a thickness of a paper-like sheet, wavelength components less than a specified wavelength are extracted from a thickness signal detected by the paper-like sheet thickness detection device, appearance positions on the paper-like sheet are determined at which the extracted wavelength components being less than the specified wavelength and having amplitude not less than a constant value appear, and the thus determined appearance positions are collated with stored appearance positions on the paper-like sheet at which the wavelength components being less than the specified wavelength and having the amplitude not less than the constant value appear, so as to discriminate genuineness/spuriousness of the paper-like sheet.

Also, to accomplish the above object, in a paper-like sheet discriminator having a paper-like sheet thickness detection device for detecting a thickness of a paper-like sheet, a longitudinal positional course along which the paper-like sheet passes through the paper-like sheet detection device is detected, wavelength components less than a specified wavelength are extracted from a thickness signal detected by the paper-like sheet thickness detection device, appearance positions on the paper-like sheet are determined at which the extracted wavelength components being less than the specified wavelength and having amplitude not less than a constant value appear, and the thus determined appearance positions are collated with stored appearance positions, corresponding to the longitudinal positional course for passage of the paper-like sheet and at which the wavelength components being less than the specified wavelength and having the amplitude not less than the constant value appear, so as to discriminate genuineness/spuriousness of the paper-like sheet.

Also, to accomplish the above object, wavelength components less than a specified wavelength are extracted from a paper-like sheet thickness detection signal, a waveform obtained by extracting the wavelength components less than the specified wavelength of the thickness detection signal is subtracted from the waveform having the extracted wavelength components less than the specified wavelength to determine appearance positions on the paper-like sheet at which the extracted wavelength components being less than the specified wavelength and having amplitude not less than a constant value appear, and the thus determined appearance positions are collated with stored appearance positions on the paper-like sheet at which the wavelength components being less than the specified wavelength and having the amplitude not less than the constant value appear, so as to discriminate genuineness/spuriousness of the paper-like sheet.

Also, to accomplish the above object, appearance positions on the paper-like sheet are determined at which the extracted wavelength components being less than the specified wavelength and having amplitude not less than a constant value appear, and the thus determined appearance positions are collated with precedently stored appearance positions, corresponding to a longitudinal positional course for passage of the paper-like sheet and at which wavelength components being less than the specified wavelength and having the amplitude not less than the constant value appear, so as to discriminate genuineness/spuriousness of the paper-like sheet.

Also, to accomplish the above object, a plurality of paper-like sheet thickness detection devices are provided orthogonally to the conveyance direction of paper money, and the continuity of appearance positions at which wavelength components being less than a specified wavelength and having amplitude not less than a constant value appear is collated mutually between adjacent paper-like sheet thickness detection devices, so as to discriminate genuineness/spuriousness of the paper-like sheet.

Also, to accomplish the above object, appearance positions at which wavelength components of the paper-like sheet being less than the specified wavelength and having the amplitude either not less than or less than the constant value appear are stored in a geometrical expression of a coordinate system having its origin at an intersection of two orthogonal sides of the paper-like sheet, and positions, corresponding to the longitudinal positional course for passage of the paper-like sheet and at which the wavelength components being less than the specified wavelength and having the amplitude either not less than or less than the constant value appear, are determined through calculation.

Also, to accomplish the above object, for extraction of the wavelength from the thickness detection signal, a wavelength, which is less than a detection width being in contact with or projected upon the paper-like sheet thickness detection device in the conveyance direction of the paper-like sheet, is extracted.

Also, to accomplish the above object, for extraction of the wavelength from the thickness detection signal, a wavelength of less than 0.8 mm is extracted.

Also, to accomplish the above object, in a paper-like sheet discriminator having a paper-like sheet thickness detection device for detecting a thickness of a paper-like sheet, wavelengths in a specified range are detected from a thickness detection signal of the paper-like sheet detected by the paper-like sheet thickness detection device, an integral value of full-wave rectification of the wavelengths in the specified range is determined and collated with a precedently stored integral value of full-wave rectification of the wavelengths in the specified range so as to detect crumples in the paper-like sheet.

Also, to accomplish the above object, in a paper-like sheet discriminator having a paper-like sheet thickness detection device for detecting a thickness of a paper-like sheet, a longitudinal positional course along which the paper-like sheet passes through a thickness detector of the paper-like sheet thickness detection device is detected, wavelengths in a specified range are extracted from a thickness detection signal of the paper-like sheet detected by the paper-like sheet thickness detection device, an integral value of full-wave rectification of wavelengths in the specified range is determined, and the thus determined integral value is compared with an integral value of full-wave rectification of the wavelengths in the specified range precedently stored in correspondence with the longitudinal positional course for passage of the paper-like sheet so as to detect crumples in the paper-like sheet.

Other objects, features and advantages of the invention will become apparent from the following description of the embodiments of the invention taken in conjunction with the accompanying drawings.

DETAILED DESCRIPTION OF THE INVENTION

Firstly, a paper money discriminator used in a general automatic teller machine (ATM) will be described with reference to FIG. 15.

Figure 15:
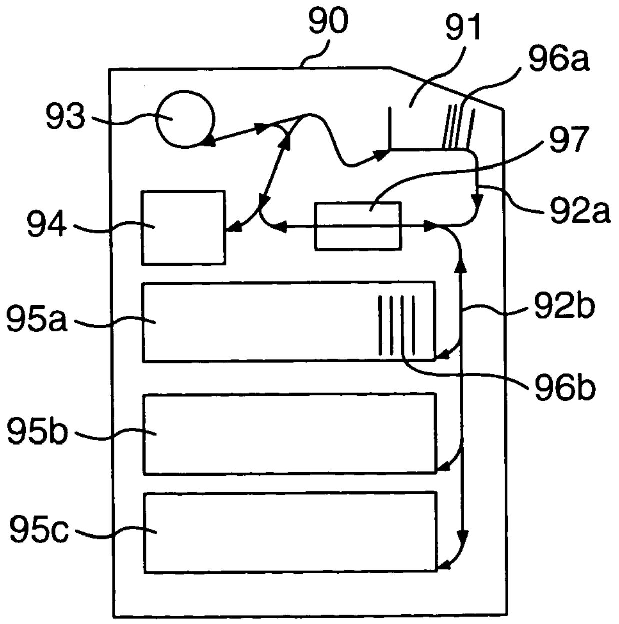
FIG. 15 is a block diagram showing an embodiment of an ATM using the paper money discriminator according to the invention.

The paper money handling unit used in the ATM is constructed as schematically illustrated in FIG. 15.

In FIG. 15, the paper money handling unit 90 is comprised of a money receipt/payment port 91 for receiving/paying paper money 96*a* from/to customers, a reject box 94 for accommodating paper money unsuited for payment, paper storages 95*a*, 95*b* and 95*c* for accommodating or discharging paper money 96*b*, a paper money discriminator 97 for discriminating the status of paper money, a temporary keeper 93 having the custody of received paper money temporarily, and paper money conveyance channels 92*a* and 92*b* for interconnecting the above constituent components so as to convey paper money handled by the paper money handling unit 90.

The paper money discriminator 97 will be described specifically.

The paper money discriminator 97 includes an image sensor for detecting patterns on a paper money sheet, a magnetic sensor for detecting magnetic patterns on the paper sheet, a genuineness/spuriousness discrimination device constructed of a fluorescent sensor for detecting fluorescent images of the paper money so as to discriminate the denomination or the genuineness/spuriousness of the paper money, and a paper money thickness detection device. The paper money thickness detection device has a number of thickness detection sensors arranged in a so-called staggered fashion in a direction orthogonal to the conveyance direction of paper money, each sensor having the ability to detect a paper money thickness of about 100 micron meters with a dispersion accuracy of not greater than 10 micron meters.

This makes it possible to detect pile-up sheet conveyance in which two or more overlapping sheets of paper money are conveyed, paper money affixed with a tape or paper, paper money partly lost and paper money partly folded.

Further, high-frequency components of a detected paper money thickness signal are extracted and used for the genuineness/spuriousness discrimination device adapted to discriminate the genuineness/spuriousness of paper money by detecting unevenness (depressions/raised portions) on paper money due to, for example, intaglio printing.

In addition, crumples in paper money are detected from frequency components of a detected paper money thickness signal so that crumpled paper money may be prevented from being returned or flown back.

Incidentally, as has been described in connection with problems to be solved, the thickness of coating materials painted on paper money as a means to prevent spurious paper money production is changed delicately color by color. Recently, however, spurious paper money changed in thickness even delicately color by color through a skillful trick has come out.

Accordingly, there is a possibility that the general genuineness/spuriousness discrimination device will fail to make an accurate discrimination.

Under the circumstances, the inventors of the present invention have studied various devices capable of discriminating the genuineness/spuriousness with high accuracies to reach embodiments as below.

An embodiment of the present invention will now be described with reference to the accompanying drawings.

Figure 1:
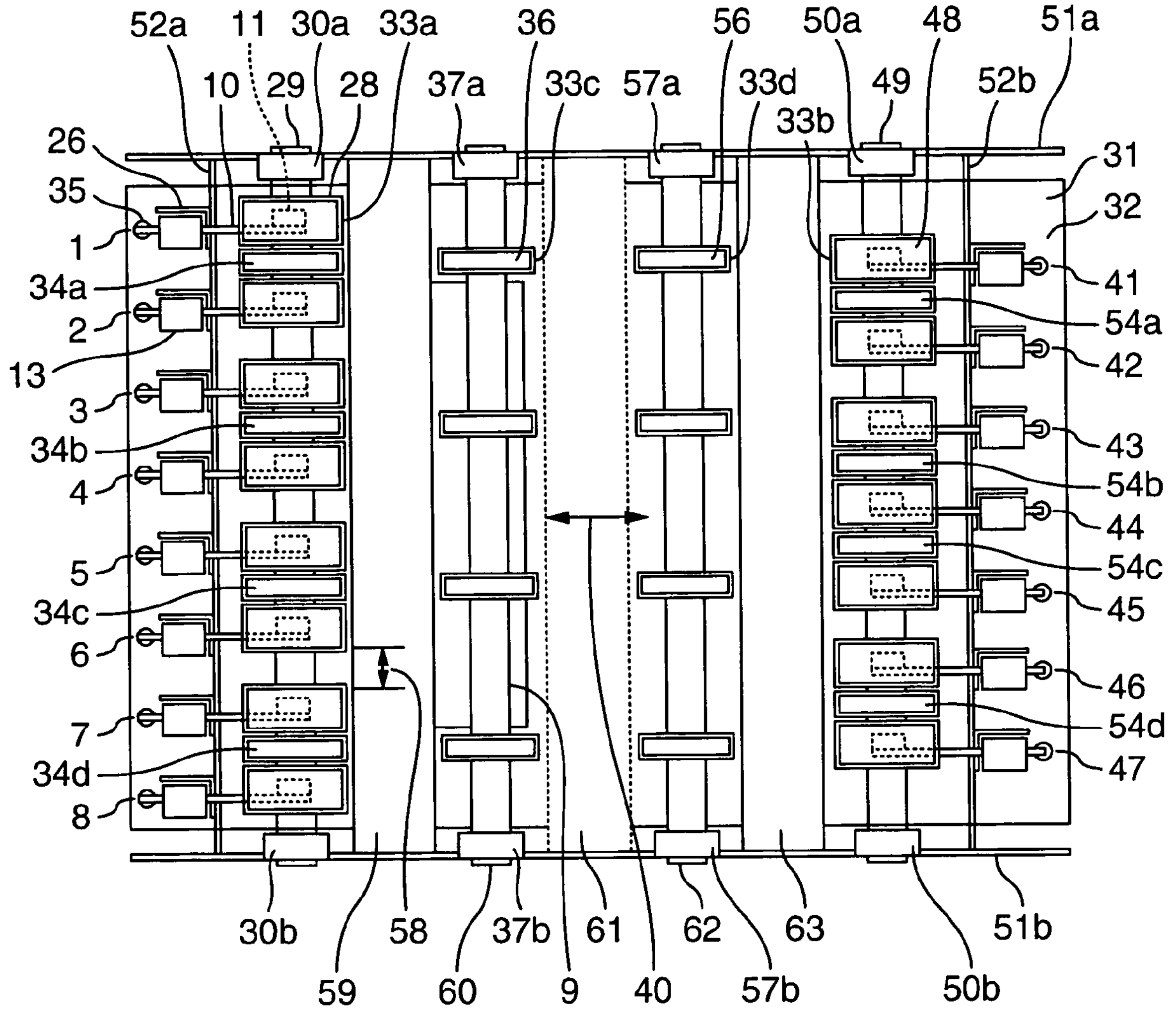
FIG. 1 is a top view of a paper money discriminator according to an embodiment of the invention.
Figure 2:
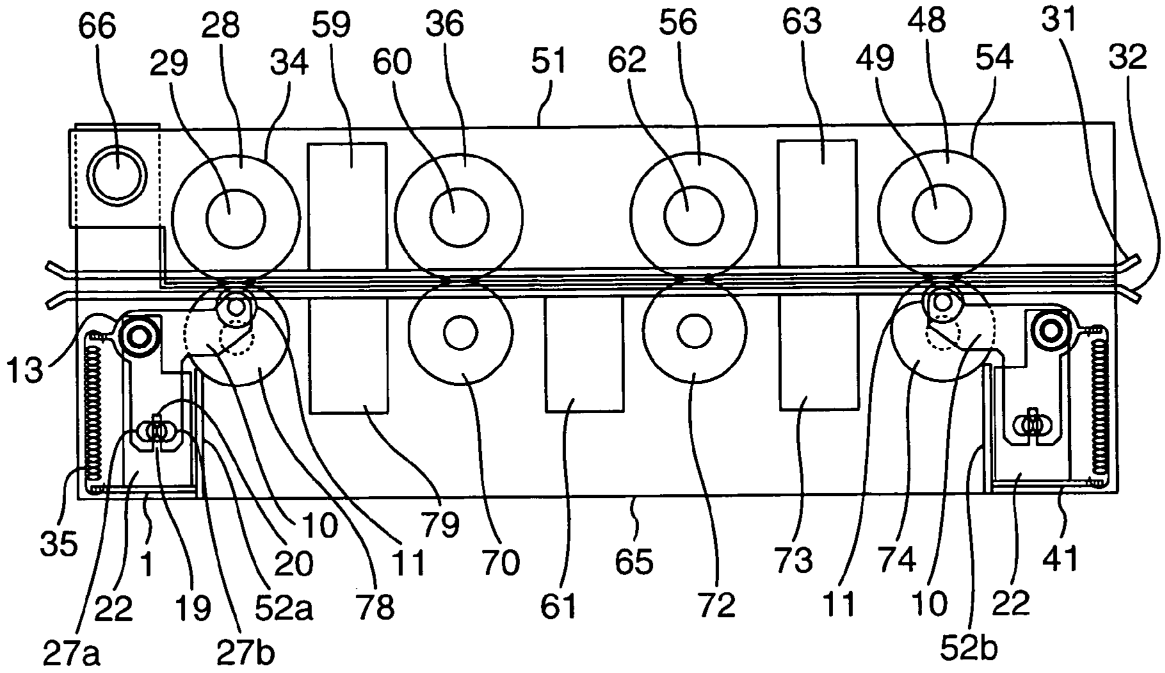
FIG. 2 is a side view of FIG. 1.

A paper money discriminator according to the embodiment of the invention will be described by making reference to FIGS. 1 and 2 showing its top and side views, respectively.

As shown in FIGS. 1 and 2, the discriminator has upper frames 51*a* and 51*b*, lower frames 65 shown in FIG. 2, transverse plates 52*a* and 52*b* fixed to the lower frames 65, and upper and lower guides 31 and 32 made of a transparent material and adapted to guide conveyance of paper money 9. The upper guide 31 is fixedly mounted to the upper frames 51 arranged in parallel with constant spacing therebetween and the lower guide 32 is also secured to the lower frames 65 similarly spaced and disposed. The upper frames 65 can be opened/closed vertically by means of a rotary member 66. The upper guide 31 is formed with windows 33*a* and 33*b* (shown in FIG. 1) for enabling reference rollers 28 and 48, respectively, to jut out and windows 33*c* and 33*d* (also shown in FIG. 1) for enabling upper conveyance rollers 34, 36, 54 and 56, respectively, to jut out.

Similarly, the lower guide 32 shown in FIG. 2 is formed with windows (not shown) for enabling detection rollers 11 positioned to oppose the reference rollers 28 and 48 to jut out and windows (also not shown) for enabling lower conveyance rollers 78, 70, 72 and 74 positioned to oppose the upper conveyance rollers 34, 36, 54 and 56 to jut out. Drive roller shafts 29 and 49 are mounted to the frames 51*a* and 51*b* through the medium of anti-friction bearings 30*a* and 30*b* and anti-friction bearings 50*a* and 50*b* as shown in FIG. 1, so that a number of reference rollers 28 and 48 for detection of the thickness of paper money and a number of upper conveyance rollers 34*a* to 34*d* and 54*a* to 54*d* for conveyance of paper money can be driven to rotate.

Similarly, upper conveyance roller shafts 60 and 62 are mounted to the frames 51*a* and 51*b* through anti-friction bearings 37*a* and 37*b* and anti-friction bearings 57*a* and 57*b*, so that a number of upper conveyance rollers 36 and 56 provided for conveying paper money can be driven to rotate. Thickness detection sensors 1 to 8 and 41 to 47 are attached to the transverse plates 52*a* and 52*b* at constant intervals 58 by means of L-members 26.

The upper and lower guides 31 and 32 are mounted with image sensors 63 and 73 (shown in FIG. 2) for detection patterns on paper money, respectively, and fluorescent sensors 59 and 79 for detection of fluorescent images on paper money, respectively. The lower guide 32 is also mounted with a magnetic sensor 61 for detection of magnetic patterns on paper money.

The lower conveyance rollers 78, 70, 72 and 74 are built in with springs (not shown) for urging them against the upper conveyance rollers 34, 36, 56 and 54. The springs are supported by means of holders fixed to the lower conveyance guide 32. The paper money 9 can be conveyed bi-directionally as shown at arrow 40 in FIG. 1.

Each of the thickness detection sensors 1 to 8 and 41 to 47 is comprised of a detection roller 11 constructed of an anti-friction bearing, a lever 10 having the detection roller 11 at one end and a slit 20 for detection of displacement at the other end, a rotary support 13 for rotatably supporting the lever 10, the L-member 26 for fixing the shaft of the rotary support 13, a spring 35 for urging the detection roller 11 against the reference roller 28 and a displacement converter 22 having a light emitting element 19 and light receiving elements 27*a* and 27*b*. The lever 10 is shaped by bending it at substantially right angles and has, at its one end, a shaft to which an inner wheel of the detection roller 11 is fixedly mounted in order to prevent the detection roller 11 from being moved axially.

The lever has, at the other end, the slit 20 through which light passes. The rotary support 13 of lever 10 has, as shown in FIG. 2, a shaft fixed to the L-member 26 and a pair of anti-friction bearings having their outer wheels secured to the lever 10. Inner wheels of the anti-friction bearings are bonded to the shaft while applying a pre-pressure to the bearings so as to prevent them from being shifted radially and axially.

In the thickness sensor 1 as shown in FIG. 1, the detection roller 11 is moved downwards when paper money 9 is squeezed by the reference roller 28 and detection roller 11. As a result, the slit 20 is moved leftwards. The movement of the slit 20 causes the quantity of light emanating from the light emitting element 19 and received by the light receiving element 27*a* to increase and that received by the light receiving element 27*b* to decrease. Output voltages a and b delivered out of the light receiving elements 27*a* and 27*b* and changing differentially are detected to detect a thickness of the paper money 9 through an operation (a−b)/(a+b). In this case, the lever ratio of lever 10 is 1 to 1. The thickness detection sensor 41 operates in a similar manner.

As described above, according to the present embodiment, the displacement signals a and b of the two light receiving elements differentially change with a displacement and therefore, by using these signals in combination with the calculation method of (a−b)/(a+b), the influence of external noise, light emitting element characteristics, light receiving element characteristics and working errors can be cancelled and highly accurate detection with a high accuracy of about several of micron meters can be ensured. In addition, the influence of decreased outputs of displacement signals caused by temperature changes, degradation of light emitting and receiving elements due to aging and decreased light quantity due to dusts can be cancelled.

Of these paper money thickness detection devices, ones having detectors positioned on the left in FIG. 1 are called a first detector section and the other ones having detectors positioned on the right in FIG. 1 are called a second detector section. More particularly, the first detector section includes the thickness detection sensors 1 to 8, the reference rollers 28, the detection rollers 11 and the anti-friction bearings 30*a* and 30*b* whereas the second detector section includes the thickness detection sensors 41 to 47, the reference rollers 48, the detection rollers 11 and the anti-friction bearings 50*a* and 50*b*.

It is to be noted that the thickness detection sensors 1 to 8 included in the first detector section are arranged in staggered relationship to the thickness detection sensors 41 to 47 included in the second detector section so that the sensors 1 to 8 and the sensors 41 to 47 may be complemented mutually in the axial directions of the drive roller shafts 29 and 49 as shown in FIG. 1.

Then, the upper conveyance rollers 34*a* to 34*d* on the drive roller shaft 29, the upper conveyance rollers 54*a* to 54*d* on the drive roller shaft 49, the upper convey rollers 36 on the conveyance roller shaft 60 and the upper conveyance rollers 56 on the conveyance roller shaft 62 have each a metal roller encircled by an elastic member such as rubber.

The rollers 28 and 48 are metal rollers. The metal roller does not change in roller diameter when it squeezes paper money and can therefore detect a slight change in thickness of the paper money. Preferably, in this case, the detection roller has an outer diameter of 10 mm, a width of 4 mm and a paper money pressing force of 300 gf, and the reference roller has a diameter of 20 mm. At that time, the contact width between detection roller 11 and paper money 9 is about 0.8 mm.

Alternatively, the detection roller 11 may be constructed of a plurality of anti-friction bearings arrayed transversely or may have one roller incorporating anti-friction bearings at its opposite ends. The anti-friction bearing may be substituted by a slip bearing or may otherwise be omitted.

With the above construction, the second detector section is provided which includes the plurality of thickness sensors 41 to 47 arranged to mutually complement the spacing between adjacent ones of the plurality of detection sensors 1 to 8 included in the first detector section, thus bringing about an advantage that high-frequency components of paper money thickness signals detected over the entire surface of the paper money can be extracted and the unevenness or depressions/raised portions due to intaglio printing on the paper money can be detected to thereby discriminate the genuineness/spuriousness of the paper money. Advantageously, crumples in paper money can also be detected from frequency components of the detected paper money thickness signals to prevent crumpled paper money from being returned.

Figure 3:
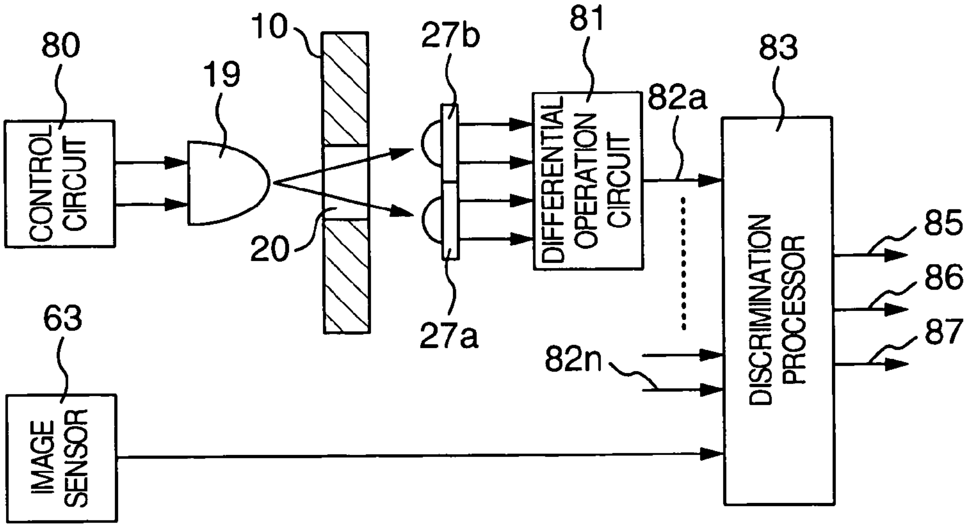
FIG. 3 is a schematic block diagram showing a displacement detector according to an embodiment of the invention and a discrimination process.

Referring to FIG. 3, the displacement detector of the thickness detection sensor is constructed as schematically illustrated therein to perform a discrimination process.

In FIG. 3, the displacement detector of the thickness detection sensor has the light emitting element 19 such as LED and the light receiving elements 27*a* and 27*b* such as photodiodes. As the slit 20 formed in the lever 10 moves, the quantity of light emanating from the light emitting element 19 and received by the light receiving elements 27*a* and 27*b* increases or decreases. The light receiving elements 27*a* and 27*b* are formed on a substrate integrally therewith to minimize the spacing between these elements and therefore the shape of the light receiver can be miniaturized.

In the discrimination process, a circuit 80 controls light emanating from the light emitting element 19, a differential operation circuit 81 amplifies differential outputs a and b of the light receiving elements 27*a* and 27*b* to deliver an operation value 82*a* of (a−b)/(a+b), and a thickness of paper money is detected from operation values 82*a* to 82*n* represented by (a−b)/(a+b) from the thickness detection sensors 1 to 8 and 41 to 47 in FIG. 1. Further, position (shift) and inclination (skew) of paper money from the image sensors 63 and 67 are used to calculate a longitudinal positional course for passage of paper money. When the longitudinal positional course and thickness of the paper money are detected, it is decided, from precedently stored thickness reference values and thickness patterns on the longitudinal positional course, whether the paper money undergoes pile-up sheet conveyance in which two or more overlapping sheets are conveyed, is affixed with a tape or paper, is partly lost or is folded, and then a control signal 85 for determining either collection or circulation is delivered.

In addition, high-frequency components of the detected paper money thickness signal are extracted to detect the unevenness on paper money due to, for example, intaglio printing and the detected unevenness is collated with precedently stored appearance positions of unevenness on the longitudinal positional course for passage of paper money to decide whether the paper money is genuine or spurious, thereby delivering a control signal 86 indicative of genuine or spurious paper. Further, crumples in the paper money are detected from frequency components of the detected paper money thickness signal and a control signal 87 for preventing a crumpled paper money sheet from being returned is delivered. These control signals 85, 86 and 87 are delivered out of a discrimination processor 83. In the discrimination processor 83, amounts of skew and shift of paper money can also be calculated using signals from the thickness detection sensors 1 to 8 and 41 to 47.

The longitudinal positional course for passage of paper money can be determined by measuring coordinates at two corners of the paper money in the longitudinal direction. Assuming that the two coordinates are $(x_1,y_1)$ and $(x_2,y_2)$ and x-coordinate positions of n detection rollers 11 are $x_0$ to $x_n$, positions at which the paper money passes through the n detection rollers can be determined geometrically.

Figure 4:
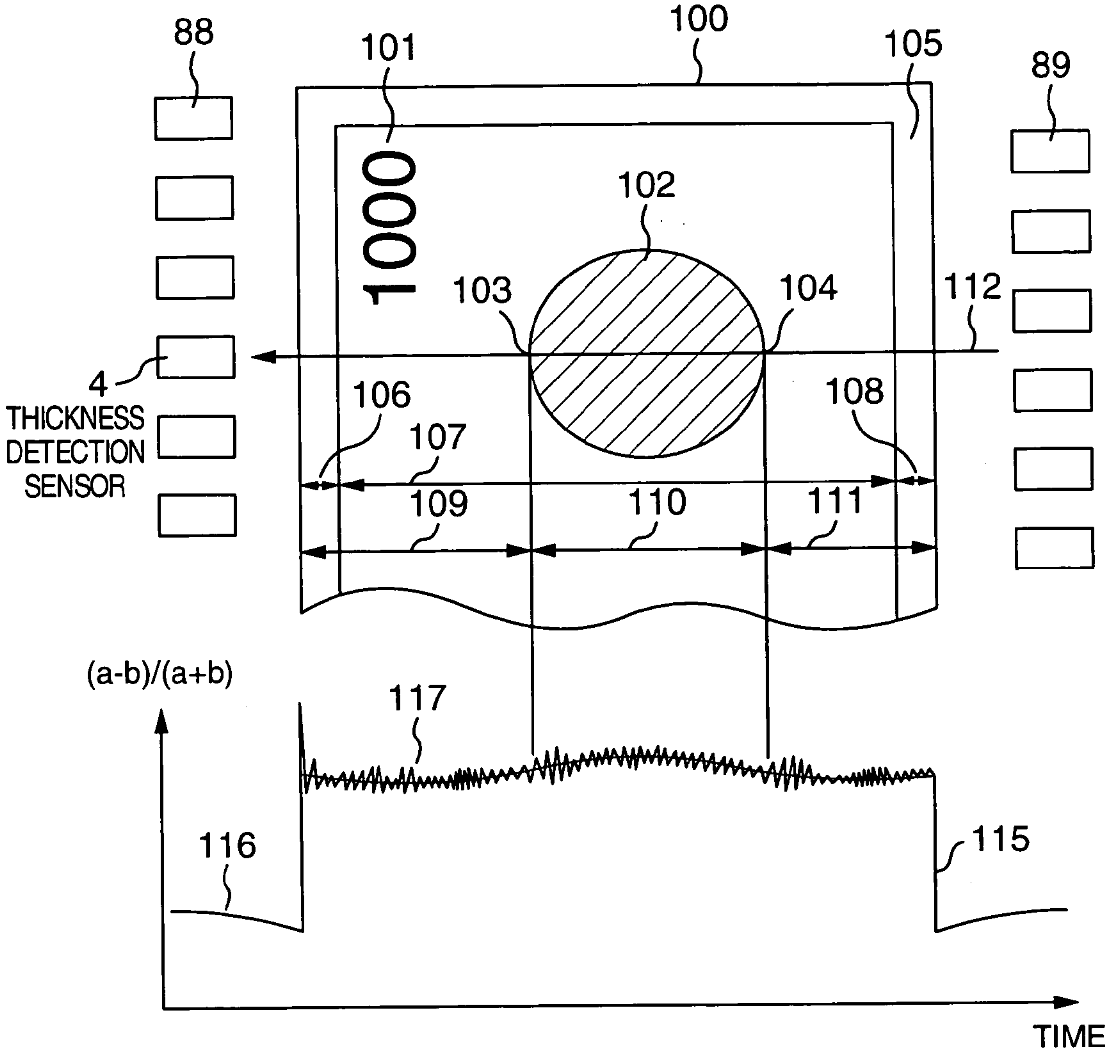
FIG. 4 is a diagram showing the relation between a longitudinal positional course along which paper money passes and a thickness detection signal in the present invention.

Referring now to FIG. 4, there is illustrated the relation between the pattern of paper money and the paper money thickness detection signal.

In FIG. 4, paper money 100 has an intagliated money term character portion 101, a watermarked portion 102, opposite ends 103 and 104 of the watermarked portion 102 and a portion 105 devoid of pattern. Positions referenced to the opposite ends of paper money 100 and indicative of the portion 105 devoid of pattern are designated by 106, 107 and 108 and those indicative of the watermarked portion 102 are designated by 109, 110 and 111. Positions of the thickness detection sensors are designated by reference numerals 88 and 89. A longitudinal positional course along which the paper money 100 passes through the thickness detection sensor 4 is indicated by arrow 112. A thickness detection signal 115 detected by the thickness detection sensor 4 during the passage is graphically illustrated, where abscissa represents time and ordinate represents (a−b)/(a+b) voltage. The thickness detection signal 115 has a portion 116 obtained when passage of paper money does not take place and a portion 117 obtained when the paper money passes through the sensor. As will be seen from the figure, at the time that the paper money is squeezed, the thickness detection signal 115 exhibits an overshoot in response to a thickness of the paper money. Subsequently, signals responsive to the changes in thickness of paper money, the intaglio printing, the watermarked portion and the portion devoid of pattern are delivered. A large undulation in thickness detection signal 115 represents a fluctuation due to eccentricity of the reference roller. Especially, the intagliated portion drawn by line drawing has inked and raised unevenness (a thin part being drawn by 10 thin lines/mm) and exhibits output change characteristics of high frequencies. More specifically, a pattern of money term portion, portrait portion or utensil exhibits output change characteristics of high frequency and large amplitude. The watermarked portion is formed by changing the thickness of paper money and therefore it exhibits output change characteristics of large amplitude. Further, the portion devoid of pattern exhibits output change characteristics of low frequency and small amplitude.

Figure 5:
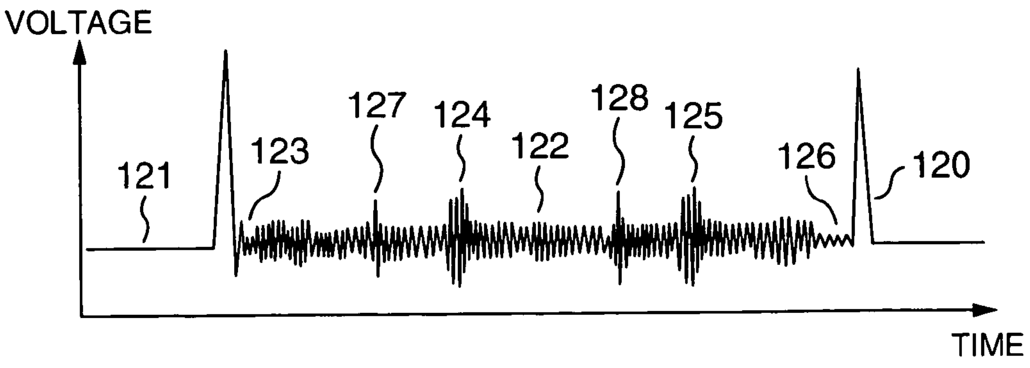
FIG. 5 is a time chart showing a high-pass filter output signal of the FIG. 4 thickness detection signal in the invention.

The FIG. 4 thickness detection signal is passed through a high-pass filter to provide an output signal as shown in FIG. 5.

A high-pass filter output signal 120 is graphically illustrated in FIG. 5, where abscissa represents time and ordinate represents voltage. An output signal portion appearing before paper money passes is designated by reference numeral 121 and an output signal portion appearing during the passage of paper money is designated by 122. An output signal portion designated by 123 and having low frequency and small amplitude represents the portion 105 devoid of pattern, an output signal portion designated by 127 and having high frequency and large amplitude represents a portion where the unevenness changes to a large extent owing to paper money patterns and changes in thickness of paper money, an output signal portion designated by 124 and having large amplitude represents one end 103 of watermarked portion 102, an output signal portion designated by 128 and having large amplitude represents a part in watermarked portion 102 where the unevenness changes largely, an output signal portion 125 designated by 125 and having large amplitude represents the other end 104 of watermarked portion 102, and an output signal portion designated by 126 and having low frequency and small amplitude represents the portion 105 devoid of pattern. In this example, the paper money conveyance speed is 1.6 mm/sec. and the cut-off frequency of high-pass filter is 7.5 kHz (0.2 mm wavelength). With the 1.6 m/s paper money conveyance speed as above, the cut-off frequency of high-pass filter may be 2 kHz or more (0.8 mm or less wavelength).

By converting the thickness detection signal into the high-frequency signal having passed through the high-pass filter, abrupt fluctuation noise of low frequencies due to eccentricity of the reference roller or fluctuations caused by crumples can be eliminated. This brings about an advantage that the length and height can be detected stably at the intagliated, high-frequency portion drawn by line drawing and being characteristic of paper money.

Figure 6:
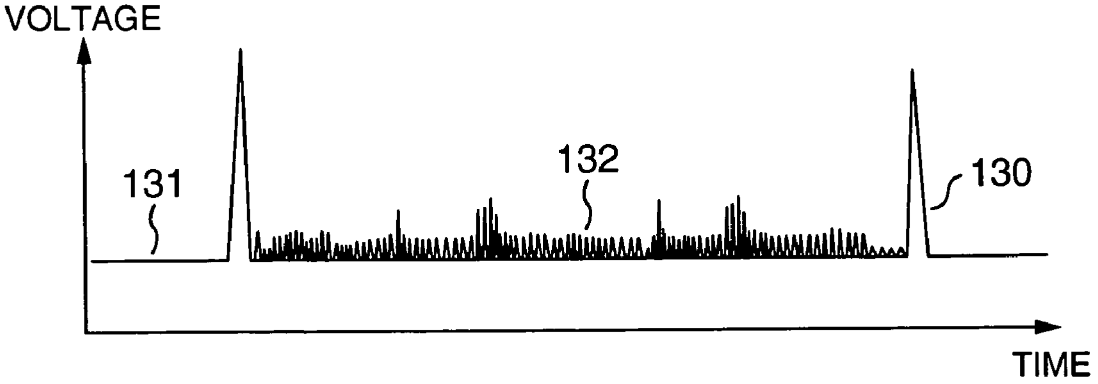
FIG. 6 is a time chart showing a full-wave rectification waveform of the FIG. 5 high-pass filter output signal in the invention.

The high-pass filter output signal of FIG. 5 is subjected to full-wave rectification to provide an output waveform as shown in FIG. 6.

A full-wave rectified waveform 130 is graphically illustrated in FIG. 6, where abscissa represents time and ordinate represents voltage. An output signal portion before passage of paper money is designated by reference numeral 131 and an output signal portion during the passage of paper money is designated by reference numeral 132.

Figure 7:
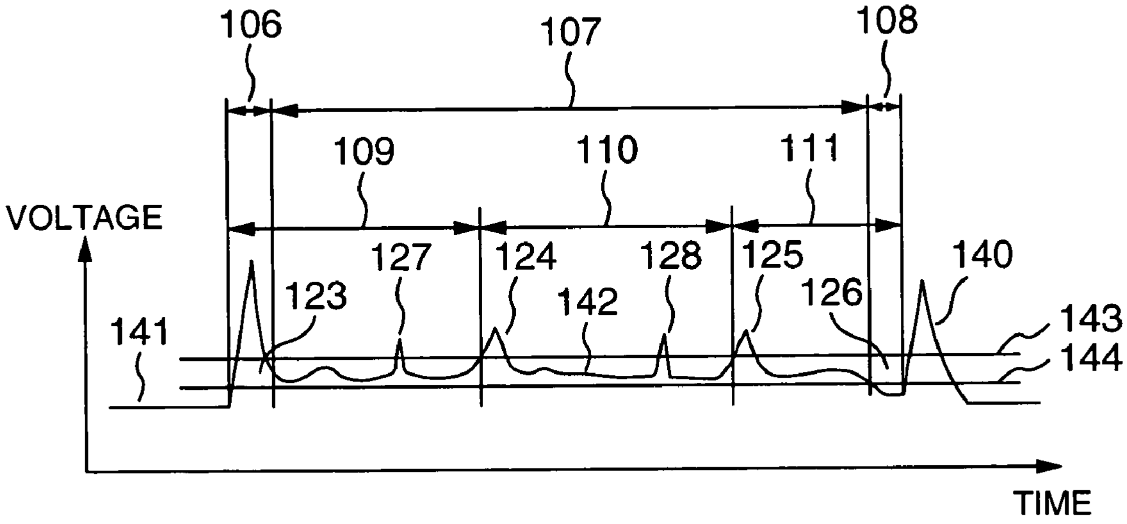
FIG. 7 is a time chart showing an output waveform obtained by applying a moving average process to the FIG. 6 full-wave rectification waveform in the invention.

The full-wave rectified waveform of FIG. 6 is subjected to a moving average process to provide an output waveform as shown in FIG. 7.

A moving-average processed waveform 140 is graphically illustrated in FIG. 7, where abscissa represents time and ordinate represents voltage. An output waveform portion before passage of paper money is designated by reference numeral 141 and an output waveform portion during the passage of paper money is designated by reference numeral 142. Reference numerals 123 to 128 are identical to those designating corresponding waveform portions shown in FIG. 5, thus indicating output waveform portions corresponding to patterns at which the paper money 100 shown in FIG. 4 passes through the thickness sensor. Further, reference numerals 106 to 111 indicate positions corresponding to patterns at which the paper money 100 shown in FIG. 4 passes through the thickness sensor. In addition, a threshold value 143 indicates one for extracting positions characteristic of large changes in unevenness and a threshold value 144 is one for extracting positions characteristic of no unevenness. In this example, the moving average process is applied but alternatively, an output waveform passed through a low-pass filter may be used. Further, in an alternative, a waveform may be used which is formed by connecting peak values of a half-wave waveform.

Figure 8:
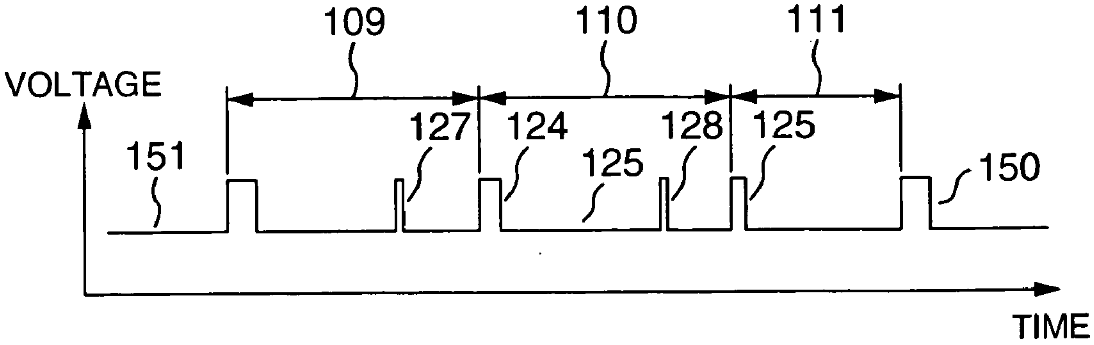
FIG. 8 is a time chart showing a binary output waveform indicative of raised parts in the FIG. 7 moving-average processed waveform in the invention.

Raised parts are extracted from the moving-average processed waveform of FIG. 7 to provide a binary output waveform as shown in FIG. 8.

An extracted raised part binary waveform 150 is graphically illustrated in FIG. 8, where abscissa represents time and ordinate represents voltage. An output waveform portion before passage of paper money is designated by reference numeral 151 and an output waveform portion during the passage of paper money is designated by reference numeral 152. In this example, the level exceeding the threshold value 143 in the moving-average processed waveform shown in FIG. 7 is defined as level "1" and the level less than the threshold value 143 is defined as level "0". In this manner, the positions 109, 110 and 111 indicative of the parts 124 and 125 characteristic of the paper money can be detected. Then, the thus detected positions are collated with precedently stored, raised parts characteristic of paper money on individual longitudinal positional courses along which the paper money passes to thereby determine the paper money to be genuine if coincidence is obtained but to be spurious if non-coincidence results. Depending on the longitudinal positional courses, the number of parts characteristic of paper money is single or plural or, in some case, null. Therefore, it is preferable to carry out detection by using a plurality of thickness detection sensors. It will be appreciated that raised parts 127 and 128 are not characteristic of paper money and handled as noises which in turn are excluded from decision.

Conversely to the above, portions characteristic of paper money where raised parts should not exist, for example, portions 126 removed of pattern are stored in advance in respect of the individual longitudinal positional courses for passage of paper money and they are collated with detected waveforms. If coincidence is obtained through the collation, the paper money can be determined to be spurious but if non-coincidence results, the paper money can be determined to be genuine.

Figure 9:
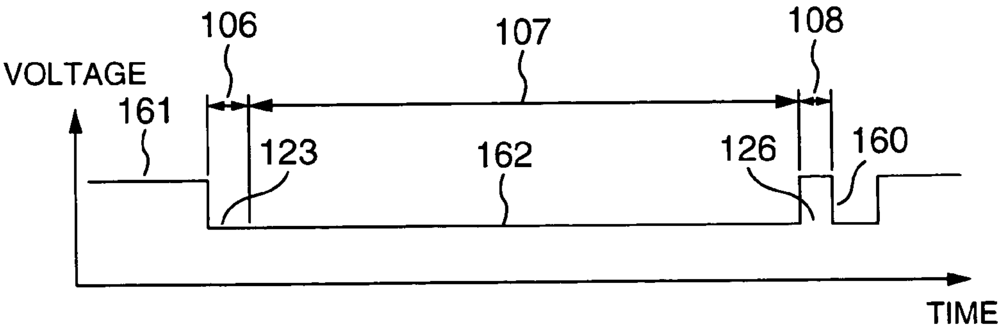
FIG. 9 is a time chart showing a binary output waveform indicative of depressions in the FIG. 7 moving-average processed waveform in the invention.

Depressions are extracted from the moving-average processed waveform of FIG. 7 to provide a binary output waveform as shown in FIG. 9.

A depression extracting binary waveform 160 is graphically illustrated in FIG. 9, where abscissa represents time and ordinate represents voltage. An output waveform portion before passage of paper money is designated by reference numeral 161 and an output waveform portion during the passage of paper money is designated by reference numeral 162. In this example, the level less than the threshold value 144 in the moving-average processed waveform shown in FIG. 7 is defined as level "1" and that not less than the threshold value 144 is defined as level "0". In this manner, the positions 106, 107 and 108 indicative of portions 123 and 126 characteristic of the paper money can be detected. Then, the thus detected positions are collated with precedently stored depressions characteristic of paper money on the individual longitudinal positional courses along which the paper money passes. If coincidence is obtained through the collation, the paper money is determined to be genuine but if non-coincidence results, the paper money is determined to be spurious. The characteristic portion 123 is blocked by an overshoot in the thickness detection sensor and integral characteristics in the moving average process and cannot be detected. In such a case, only the portion 126 is defined as a characteristic portion and the collation is carried out using this portion. As will be seen from the above, depending on the respective longitudinal positional courses for passage of paper money, the number of portions or parts characteristic of the paper money is single or plural or, in some case, null. Therefore, it is preferable to carry out detection by using a plurality of thickness detection sensors arrayed in the transverse direction.

Conversely to the above, characteristic portions where depressions should not exist, for example, parts 124 and 125 with pattern are stored in advance in respect of the individual longitudinal positional courses along which paper money passes and they are collated with a detected waveform. If coincidence is obtained through the collation, the paper money is determined to be spurious but if non-coincidence results, the paper money is determined to be genuine.

When the raised part and depression shown in FIGS. 8 and 9 have a pulse width not greater than a constant value, they can be handled as noises which in turn are excluded.

Alternatively, positions of raised part and depression shown in FIGS. 8 and 9 may be detected concurrently and may be collated with precedently stored positions of raised and depressive characteristic parts on the respective longitudinal positional courses for passage of paper money. If coincidence is obtained through the collation, the paper money can be determined to be genuine but if non-coincidence results, the paper money can be determined to be spurious.

The precedently stored positions of characteristic portions in the form of depressions or raised parts on the respective longitudinal positional courses along which paper money passes can be stored in terms of an expression indicative of a geometrical pattern such as an expression of straight line or an expression of circle on an coordinate system having its origin at an intersection of two orthogonal sides of paper money, so that positions at which characteristic portions in the form of depressions or raised portions appear on the longitudinal positional courses for passage of the paper money can be determined through calculation.

Further, a plurality of thickness sensors are provided in the direction orthogonal to the conveyance direction of paper money and the continuity of appearance positions of characteristic portions in the form of depressions or raised portions on the longitudinal positional courses along which the paper money passes is collated mutually between adjacent thickness detection sensors, thereby ensuring that the paper money can be determined to be genuine when the continuity of the characteristic portions is held but the paper money can be determined to be spurious when the continuity is not held.

As described above, according to the present invention, the thickness detection signal is passed through the high-pass filter to provide a high-frequency signal so that depressions/raised parts characteristic of paper money may be detected highly accurately, thus bringing about an advantage that the detected unevenness can be collated with precedently stored positions of characteristic portions in the form of depressions or raised parts on the respective longitudinal positional courses along which paper money passes to thereby discriminate the genuineness/spuriousness of the paper money.

Figure 10:
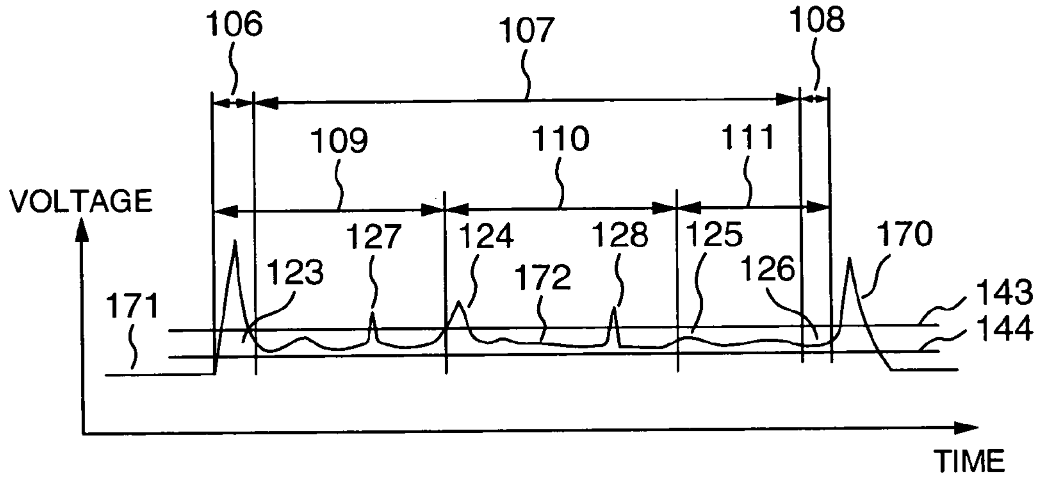
FIG. 10 is a time chart showing an output waveform obtained by moving-average processing a full-wave rectification waveform of spurious paper in the invention.

Turning now to FIG. 10, there is illustrated another embodiment for extracting positions of characteristic portions from a moving-average processed waveform.

Spurious paper is subjected to the moving average process and an output waveform as shown in FIG. 10 is obtained.

A moving-average processed waveform 170 is graphically illustrated in FIG. 10, where abscissa represents time and ordinate represents voltage. An output waveform portion before passage of paper money is designated by reference numeral 171 and an output waveform portion during the passage of paper money is designated by reference numeral 172. Reference numerals 123 to 128 are identical to those designating corresponding waveform portions shown in FIG. 5, thus indicating output waveform parts corresponding to patterns at which paper money 100 shown in FIG. 4 passes through the thickness sensor. Further, reference numerals 106 to 111 indicate positions corresponding to the patterns at which the paper money 100 shown in FIG. 4 passes through the thickness sensor.

In the spurious paper waveform shown in FIG. 10, the unevenness is small at the portion 125 but is large at the portion 126, exhibiting the difference from genuine paper.

Figure 11:
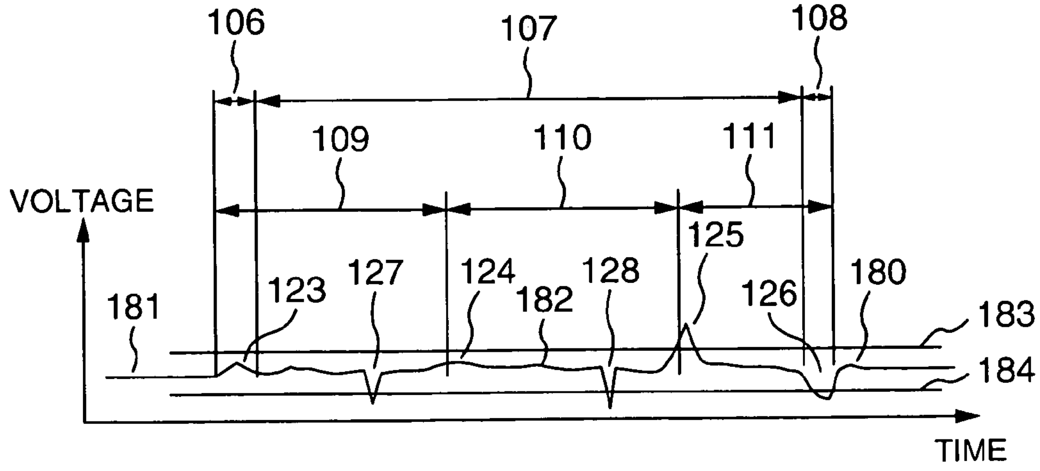
FIG. 11 is a time chart showing a moving-average process subtracted waveform obtained from genuine paper and the FIG. 10 spurious paper in the invention.

Referring to FIG. 11, there is illustrated a moving-average process subtracted waveform obtained by subtracting the FIG. 10 moving-average processed waveform of spurious pager from a precedently stored moving-average processed waveform of genuine paper.

A moving-average process subtracted waveform 180 is graphically illustrated in FIG. 11, where abscissa represents time and ordinate represents voltage. An output waveform portion before passage of paper money is designated by reference numeral 181 and an output waveform portion during the passage of paper money is designated by reference numeral 182. Reference numerals 123 to 128 and 106 to 111 are identical to those designating corresponding waveform portions in FIG. 10.

Firstly, it is assumed that the precedently stored moving-average processed waveform of genuine paper is of a signal in which the noise parts 127 and 128 are removed from the waveform shown in FIG. 7. Accordingly, in the moving-average process subtracted waveform of FIG. 11, voltage approximates null at waveform portions 123 and 124 substantially identical to those in the precedently stored moving-average processed waveform of genuine paper but voltage changes largely at waveform parts 127, 128, 125 and 126 corresponding to unequal parts. A threshold value 183 is one for extracting positive voltages indicative of changes in unevenness and a threshold value 184 is one for extracting negative voltages indicative of changes in unevenness.

Figure 12:
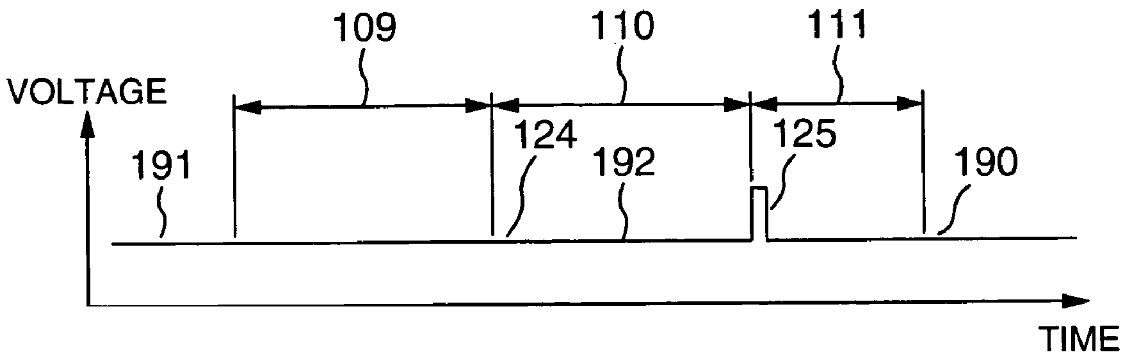
FIG. 12 is a time chart showing a binary output waveform indicative of positive voltage in the FIG. 11 moving-average process subtracted waveform in the invention.

Referring now to FIG. 12, there is illustrated a binary output waveform obtained by extracting depressions and raised portions or parts on the positive voltage side.

A binary waveform 190 is graphically illustrated in FIG. 12, where abscissa represents time and ordinate represents voltage. An output waveform portion before passage of paper money is designated by reference numeral 191 and an output waveform portion during the passage of paper money is designated by reference numeral 192. In this waveform, the level not less than the threshold value 183 in the moving-average process subtracted waveform shown in FIG. 11 is defined as level “1” and the level less than the threshold value 183 is defined as level “0”. In this case, the level is “0” at portions 123, 124 and 126 characteristic of paper money, so that it can be determined that precedently stored portions characteristic of the paper money exist. On the other hand, the level is “1” at portion 125 characteristic of paper money, so that it can be determined that any precedently stored portion characteristic of the paper money does not exist and the paper money is spurious.

Figure 13:
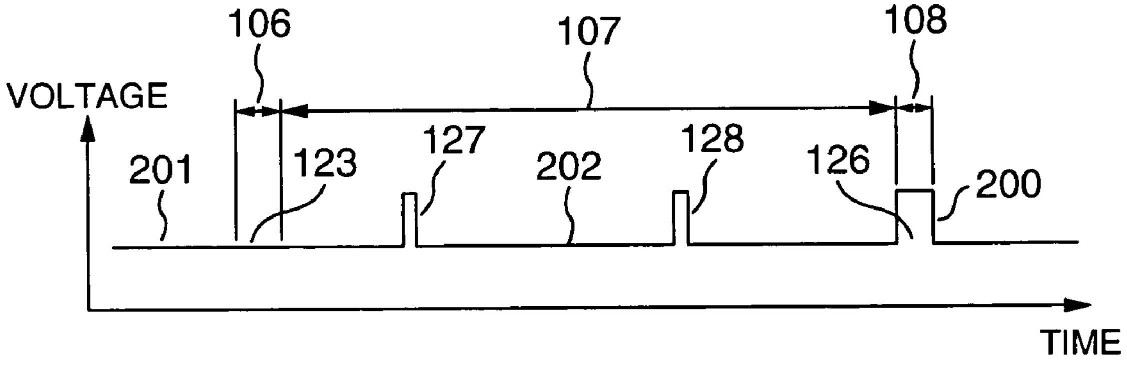
FIG. 13 is a time chart showing a binary output waveform indicative of negative voltage in the FIG. 11 moving-average process subtracted waveform in the invention.

Referring to FIG. 13, there is illustrated a binary output waveform obtained by extracting depressions and raised parts on the negative voltage side from the moving-average process subtracted waveform of FIG. 11.

A binary waveform 200 is graphically illustrated in FIG. 13, where abscissa represents time and ordinate represents voltage. An output waveform portion before passage of paper money is designated by reference numeral 201 and an output waveform portion during the passage of paper money is designated by reference numeral 202. In this example, the level less than the threshold value 184 in the moving-average process subtracted waveform shown in FIG. 11 is defined as level "1" and the level not less than the threshold value 184 is defined as level "0". In this case, the level is "0" at portions 123, 124 and 125 characteristic of the paper money, thus determining that precedently stored portions characteristic of the paper money exist. On the other hand, the level is "1" at portion 126 characteristic of the paper money, thus determining that any precedently stored portion characteristic of the paper money does not exist and the paper money is spurious. It is to be noted that raised parts 127 and 128 are not characteristic parts and are handled as noises which in turn are excluded from discrimination.

When the pulse width as shown in FIGS. 12 and 13 is less than a constant value, it can be handled as noise and excluded.

The positions of characteristic portions shown in FIGS. 12 and 13 can also be detected concurrently to decide the genuineness/spuriousness.

Positions to be stored precedently of characteristic portions in the form of depressions or raised parts on the respective longitudinal positional courses along which paper money passes can be stored in terms of an expression indicative of a geometrical pattern such as an expression of straight line or an expression of circle on an coordinate system having its origin at an intersection of two orthogonal sides of the paper money sheet, so that positions at which characteristic portions in the form of depressions or raised parts appear on the longitudinal positional courses for passage of the paper money can be determined through calculation.

Further, a plurality of thickness sensors are provided in the direction orthogonal to the conveyance direction of paper money and the continuity of appearance positions of characteristic portions in the form of depressions or raised parts on the longitudinal positional courses along which the paper money passes is collated mutually between adjacent thickness detection sensors, thereby ensuring that the paper money can be determined to be genuine when the continuity of the characteristic portions is held but the paper money can be determined to be spurious when the continuity is not held.

As described above, according to the present invention, the thickness detection signal is passed through the high-pass filter to provide a high-frequency signal so that positions of portions characteristic of paper money in the form of depressions/raised parts may be detected highly accurately, thereby bringing about an advantage that the thus detected positions can be collated with precedently stored positions of characteristic portions in the form of depressions/raised parts on the respective longitudinal positional courses for passage of paper money and the genuineness/spuriousness of the paper money can be discriminated.

Figure 14:
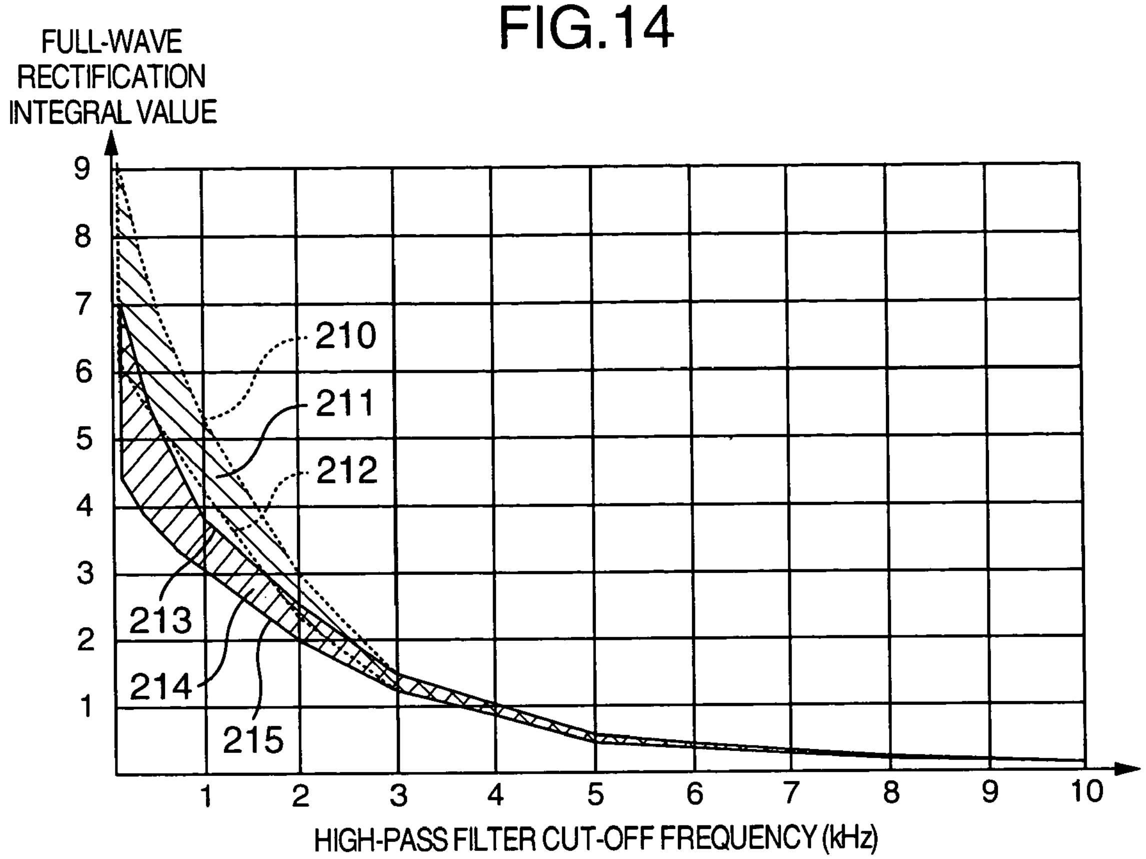
FIG. 14 is a graph showing the relation between a high-pass filter cut-off frequency of high-pass filter and an integral value of full-wave rectification obtained from genuine paper and crumpled paper in the invention.

Thickness detection signals of one sheet of genuine paper and one sheet of crumpled paper are passed through the high-pass filter and output signals are full-wave rectified and then rectified signals are integrated to provide integral values as graphically illustrated in FIG. 14.

In FIG. 14, abscissa represents the cut-off frequency of the high-pass filter and ordinate represents the full-wave rectification integral value of the output signals from the high-pass filter. Designated by reference numeral 211 are characteristics of the crumpled paper. Upper and lower limit values of a fluctuation width are designated by reference numerals 210 and 212. Designated by reference numeral 214 are characteristics of the genuine paper. Upper and lower limits of a fluctuation width are designated by reference numerals 213 and 215.

For formation of the crumpled paper used herein, an operation is conducted three times in which a sheet of genuine paper is spherically, heavily crushed in the palm and then crumples are smoothed out. As will be seen from the figure, in the range of high-pass filter cut-off frequency from 750 Hz (2 mm wavelength) to 1.5 kHz (1 mm wavelength), the integral value differs between the crumpled and genuine paper sheets. This demonstrates that when a paper money sheet of about 0.1 mm thickness is crushed in hand, many crumples are formed at 2 mm or more wavelengths and less crumpled are formed at 1 mm or less wavelengths. These numerical values can also be applicable to paper money sheets in circulation.

Accordingly, when the full-wave rectification integral values of paper thickness detection signals obtained from output signals of the high-pass filter and lying between 1 mm and 2 mm wavelengths (center frequency being 1 kHz (1.6 mm wavelength)) are compared with precedently stored full-wave rectification integral values on the respective longitudinal positional courses along which paper money passes, it can be determined that the paper money is crumpled if the former values are larger than the latter values and is prevented from being returned.

It should be understood that though not shown in FIG. 4, a paper-like sheet prepared with an OA apparatus such as laser printer or ink-jet printer has such characteristics as exhibiting a full-wave rectification integral value less than half the value of genuine paper at 2 kHz or more (less than 0.8 mm wavelength). Accordingly, when full-wave rectification integral values at 2 kHz or more (0.8 mm or less wavelengths) are compared with precedently stored full-wave rectification integral values on the respective longitudinal positional courses along which paper money passes, it can be determined that the paper money is spurious if the former values are smaller than the latter values. This is because through the use of the high-frequency signal obtained by passing the thickness detection signal through the high-pass filter, noises caused by fluctuations due to eccentricity of the reference roller or crumples can be eliminated, thereby ensuring that characteristic portions drawn by line drawing through intaglio printing and exhibiting high frequencies can be detected highly accurately paper sheet by paper sheet without dispersion.

Referring to FIG. 15, an embodiment of an ATM using the paper money discriminator according to the present embodiment will be described.

A paper money handling unit 90 built in the ATM shown in FIG. 15 has a paper money payment/receipt mechanism 91 for performing paper money separation necessary to accommodate paper money 96*a* received during receipt of money on deposit and performing payment of an money amount designated by a user during payment of cash. Connected to the paper money payment/receipt mechanism 91 is a genuineness/spuriousness discrimination device adapted to discriminate money term or genuineness/spuriousness and including paper money conveyance channels 92*a* and 92*b*, an image sensor for detecting patterns on paper money, a magnetic sensor for detecting magnetic patterns on paper money and a fluorescent sensor for detecting fluorescent images on paper money.

There is also provided a paper money thickness detection device for detecting pile-up sheet conveyance in which two or more overlapping sheets of paper money are conveyed, paper money affixed with a tape or paper, paper money partly lost and paper money partly folded. Designated by 97 is a paper money discriminator for extracting high-frequency components of a paper money thickness signal detected by the paper money thickness detection device and detecting positions of unevenness on paper money due to intaglio printing to discriminate the genuineness/spuriousness of paper money and besides detecting crumples in paper money from frequency components of the paper money thickness signal to prevent crumpled paper money from being returned.

Designated by 93 is a temporary stacker for temporarily accumulating paper money during reception and payment of paper money. Designated by 94 is a paper money collection box for accommodating paper money which cannot be handled mechanically. Designated by 95*a*, 95*b* and 95*c* are money term housing boxes for accommodating paper money 96*b* in accordance with money terms.

Operation in the ATM shown in FIG. 15 will now be described.

During reception of cash on deposit, sheets of paper money 96*a* supplied to the paper money payment/receipt mechanism 91 are separated sheet by sheet and fed to the conveyance channel 92*a*. In the paper money discriminator 97, the paper money is discriminated as to whether to be genuine or spurious and as to whether to be one sheet or two or more sheets. When the paper money is one genuine paper or one folded genuine paper, it is accumulated in the temporary stacker 93 and an amount of transactions is indicated.

On the other hand, when the fed paper money matters, all sheets of fed paper money are returned to the paper money payment/receipt mechanism 91. When the transaction is settled, the paper money is again passed through the paper money discriminator 97 so as to be checked for whether to be one sheet or two or more sheets and then accommodated in the respective money term housing boxes 95. During cash payment, the paper money 96*b* in the money term housing boxes 95 are separated sheet by sheet and then fed to the conveyance channel 92*b*. In the paper money discriminator 97, the paper money is decided as to whether to be one sheet or two or more sheets. In the case of one sheet, the paper money is paid to the paper money payment/receipt mechanism 91. In the case of two or more sheets, folded paper and crumpled paper, the paper money is accumulated in the temporary stacker and thereafter accommodated in the paper money collection box 94.

It will be appreciated that the paper money discriminator 97 is so constructed as to permit discrimination even when paper money is conveyed in either going or returning direction.

As described above, according to the present embodiment, by providing the compact paper money discriminator and making the paper conveyance path with the going and returning conveyance path, the installation area can advantageously be reduced to decrease the size of apparatus. In addition, the conveyance channel can be shortened to reduce time for reception and payment to advantage.

In the foregoing description, the paper money discriminator used for the ATM has been described but the present invention can also be applied to a paper money discriminator for use in a vending machine. Further, the thickness of a metal sheet, a resin sheet or the like can be detected provided that the sheet can pass through the space between reference roller and detection roller. In addition, for detection of the thickness of paper money, a non-contact type displacement sensor such as laser displacement meter, electrostatic capacity displacement meter or ultrasonic type thickness meter can also be used.

According to the present invention, the paper money handling unit capable of performing highly accurate genuineness/spuriousness discrimination can be provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A paper-like sheet discriminator having a paper-like sheet thickness detection device for detecting a thickness of a paper-like sheet on paper-like sheet conveyance along the total length of said paper-like sheet, said paper-like sheet discriminator comprising:

wavelength extracting means for extracting signal waveform with less than a specified wavelength from a thickness signal detected by said paper-like sheet thickness detection device, appearance positions extracting means for extracting appearance positions at which amplitude of the signal waveform extracted by the wavelength extracting means has amplitude not less than a constant value appear, collating means for collating the thus determined appearance positions by the said appearance position extracting means with precedently stored appearance positions on said paper-like sheet at which the amplitude of the signal waveform with less than said specified wavelength has the amplitude not less than the constant value appear, and judging means to judge genuineness/spuriousness of said paper-like sheet, wherein said judging means judge whether or not the appearance positions extracted by said appearance positions extracting means with the appearance positions on said paper-like sheet at which the amplitude of the signal waveform with less than said specified wavelength has the amplitude not less than the constant value appear so as to discriminate genuineness/spuriousness of said paper-like sheet.

2. A paper-like sheet discriminator having a paper-like sheet thickness detection device for detecting a thickness of a paper-like sheet on the paper-like sheet conveyance along the total length of said paper-like sheet, said paper-like sheet discriminator comprising:

passing position detecting means for a longitudinal positional course along which said paper-like sheet passes through said paper-like sheet thickness detection device, wavelength extracting means for extracting signal waveform less than a specified wavelength from a thickness signal detected by said paper-like sheet thickness detection device, appearance position extracting means for appearance positions at which the extracted amplitude of the signal waveform with less than said specified wavelength has amplitude not less than a constant value appear, collating means for collating the thus determined appearance positions by the said appearance position extracting means with precedently stored appearance positions on said paper-like sheet, corresponding to said longitudinal positional course for passage of said paper-like sheet and at which said amplitude of the signal waveform with less than said specified wavelength has the amplitude not less than the constant value appear, and judging means to judge genuineness/spuriousness of said paper-like sheet, wherein said judging means to judge whether or not the appearance positions extracted by said appearance positions extracting means is same with appearance positions on said paper-like sheet, corresponding to said longitudinal positional course for passage of said paper-like sheet and at which said amplitude of the signal waveform with less than said specified wavelength has the amplitude not less than the constant value appear so as to discriminate genuineness/spuriousness of said paper-like sheet.

3. A paper-like sheet discriminator according to claim 1, further comprising subtracting means that subtract precedently stored said paper-like sheet signal waveform with less than a specified wavelength from the signal waveform extracted by said wavelength extracting means, wherein said appearance position extracting means determine appearance positions on said paper-like sheet at which the extracted amplitude of the signal waveform with less than said specified wavelength has amplitude not less than a constant value appear using the output waveform from said subtracting means, wherein said collating means collate the thus determined appearance positions by said appearance position extracting means with precedently stored appearance positions on said paper-like sheet at which said amplitude of the signal waveform with less than said specified wavelength has the amplitude not less than said constant value appear, and wherein said judging means judge amplitude of the signal waveform with less than said specified wavelength appears elsewhere from said precedently stored appearance positions, so as to judge spuriousness.

4. A paper-like sheet discriminator according to claim 2, further comprising subtracting means that subtract precedently stored said paper-like sheet signal waveform with less than a specified wavelength from the signal waveform extracted by said wavelength extracting means, wherein said appearance position extracting means determine appearance positions on said paper-like sheet at which the extracted amplitude of the signal waveform with less than said specified wavelength has amplitude not less than a constant value appear using the output waveform from said subtracting means, wherein said collating means collate the thus determined appearance positions by said appearance position extracting means with precedently stored appearance positions on said paper-like sheet at which said amplitude of the signal waveform with less than said specified wavelength has the amplitude not less than said constant value appear, and wherein said judging means judge amplitude of the signal waveform with less than said specified wavelength appears elsewhere from said precedently stored appearance positions, so as to judge spuriousness.

5. A paper-like sheet discriminator according to claim 1, wherein said appearance positions extracting means determine appearance positions on the paper-like sheet at which said extracted amplitude of the signal waveform with less than said specified wavelength has amplitude not greater than the constant value appear, and wherein said collating means collate the thus determined appearance positions with precedently stored appearance positions, corresponding to a longitudinal positional course for passage of said paper-like sheet and at which said amplitude of the signal waveform with less than said specified wavelength has the amplitude not greater than said constant value appear, so as to discriminate genuineness/spuriousness of said paper-like sheet.

6. A paper-like sheet discriminator according to claim 2, wherein said appearance positions extracting means determine appearance positions on the paper-like sheet at which said extracted amplitude of the signal waveform with less than said specified wavelength has amplitude not greater than the constant value appear, and wherein said collating means collate the thus determined appearance positions with precedently stored appearance positions, corresponding to a longitudinal positional course for passage of said paper-like sheet and at which said amplitude of the signal waveform with less than said specified wavelength has the amplitude not greater than said constant value appear, so as to discriminate genuineness/spuriousness of said paper-like sheet.

7. A paper-like sheet discriminator according to claim 1, further comprising a plurality of paper-like sheet thickness detection devices orthogonally to the conveyance direction of paper-like sheet, and collating means to collate the continuity of appearance positions at which amplitude of the signal waveform with less than the specified wavelength has amplitude not less than or not greater than a constant value appear mutually between adjacent paper-like sheet thickness detection devices, so as to discriminate genuineness/spuriousness of the paper-like sheet.

8. A paper-like sheet discriminator according to claim 2, further comprising a plurality of paper-like sheet thickness detection devices orthogonally to the conveyance direction of paper-like sheet, and collating means to collate the continuity of appearance positions at which amplitude of the signal waveform with less than the specified wavelength has amplitude not less than or not greater than a constant value appear mutually between adjacent paper-like sheet thickness detection devices, so as to discriminate genuineness/spuriousness of the paper-like sheet.

9. A paper-like sheet discriminator according to claim 1, wherein appearance positions at which amplitude of the signal waveform of said paper-like sheet with less than said specified wavelength has the amplitude either not less than or not greater than said constant value appear are precedently stored in a geometrical expression of a coordinate system having its origin at an intersection of two orthogonal sides of said paper-like sheet, and positions, corresponding to the longitudinal positional course for passage of said paper-like sheet at which the amplitude of the signal waveform with less than said specified wavelength has the amplitude either not less than or not greater than said constant value appear, are determined through calculation.

10. A paper-like sheet discriminator according to claim 2, wherein appearance positions at which amplitude of the signal waveform of said paper-like sheet with less than said specified wavelength has the amplitude either not less than or not greater than said constant value appear are precedently stored in a geometrical expression of a coordinate system having its origin at an intersection of two orthogonal sides of said paper-like sheet, and positions, corresponding to the longitudinal positional course for passage of said paper-like sheet at which the amplitude of the signal waveform with less than said specified wavelength has the amplitude either not less than or not greater than said constant value appear, are determined through calculation.

11. A paper-like sheet discriminator according to claim 1, wherein for extraction of the wavelength from the thickness detection signal, a wavelength, which is less than detector length of said paper-like sheet thickness detection device being in contact with or projected upon said paper-like sheet in the conveyance direction of said paper-like sheet, is extracted.

12. A paper-like sheet discriminator according to claim 2, wherein for extraction of the wavelength from the thickness detection signal, a wavelength, which is less than detector length of said paper-like sheet thickness detection device being in contact with or projected upon said paper-like sheet in the conveyance direction of said paper-like sheet, is extracted.

13. A paper-like sheet discriminator according to claim 1, wherein for extraction of signal waveform with less than the wavelength, signal waveform with wavelength of not greater than 0.8 mm is extracted.

14. A paper-like sheet discriminator according to claim 2, wherein for extraction of signal waveform with less than the specified wavelength, a signal waveform with wavelength of not greater than 0.8 mm is extracted.

15. A paper-like sheet discriminator having a paper-like sheet thickness detection device for detecting a thickness of a paper-like sheet on the paper-like sheet conveyance along the total length of said paper-like sheet, comprising wavelength extracting means for extracting wavelengths in a specified range and integral means for integrating the full-wave rectified waveform of the waveform extracted by said wavelength extracting means, and collating means collate said integral value with a constant value, wherein said collating means judge said integral value is not less than a constant value, so as to determine crumples in said paper-like sheet.

16. A paper-like sheet discriminator having a paper-like sheet thickness detection device for detecting a thickness of a paper-like sheet on the paper-like sheet conveyance along the total length of said paper-like sheet, comprising:

passing position detecting means for detecting a longitudinal positional course along which the paper-like sheet passes through a thickness detector of said paper-like sheet thickness detection device, wavelength extracting means for extracting wavelengths in a specified range from signal detected by said paper-like sheet thickness detection device, integral means for integrating the full-wave rectified waveform of the waveform extracted by said wavelength extracting means, and collating means collate the integral value in correspondence with said passing position with a constant value, and judging means to judge genuineness/spuriousness of said paper-like sheet, wherein said judging means judge the integral value in correspondence with said passing position is not less than the constant value, so as to determine crumples in said paper-like sheet.

17. A paper-like sheet discriminator according to claim 15, wherein the wavelengths in said specified range are 1 mm to 2 mm.

18. A paper-like sheet discriminator according to claim 16, wherein the wavelengths in said specified range are 1 mm to 2 mm.

* * * * *